United States Patent
Mahalingam et al.

(10) Patent No.: US 9,046,977 B2
(45) Date of Patent: Jun. 2, 2015

(54) SENSOR DEVICE AND METHOD FOR DETECTING PROXIMITY EVENTS

(71) Applicant: SYNAPTICS INCORPORATED, Santa Clara, CA (US)

(72) Inventors: Vijay Venkatesh Mahalingam, Sunnyvale, CA (US); Adam Schwartz, Redwood City, CA (US); Kathy Goudarzi, Los Gatos, CA (US); Tracy Scott Dattalo, Santa Clara, CA (US)

(73) Assignee: Synaptics Incorporated, San Jose, CA (US)

( * ) Notice: Subject to any disclaimer, the term of this patent is extended or adjusted under 35 U.S.C. 154(b) by 223 days.

(21) Appl. No.: 13/712,811

(22) Filed: Dec. 12, 2012

(65) Prior Publication Data

US 2014/0160056 A1    Jun. 12, 2014

(51) Int. Cl.
*G06F 3/045* (2006.01)
*G06F 3/044* (2006.01)

(52) U.S. Cl.
CPC ...... *G06F 3/044* (2013.01); *G06F 2203/04101* (2013.01)

(58) Field of Classification Search
CPC ....... G06F 3/017; G06F 3/0488; G06F 3/044; G06F 2203/04101
See application file for complete search history.

(56) References Cited

U.S. PATENT DOCUMENTS

| 2003/0132922 | A1* | 7/2003 | Philipp | 345/173 |
| 2011/0050614 | A1* | 3/2011 | Lin et al. | 345/173 |
| 2011/0157074 | A1* | 6/2011 | Lin et al. | 345/174 |
| 2012/0299851 | A1* | 11/2012 | Homma et al. | 345/173 |
| 2013/0002601 | A1* | 1/2013 | McCracken | 345/174 |

* cited by examiner

*Primary Examiner* — Lixi C Simpson
(74) *Attorney, Agent, or Firm* — Osha Liang LLP

(57) ABSTRACT

Methods, systems and devices are described for determining positional information for objects using an input device. The various embodiments provide improved user interface functionality by facilitating user input with input objects that are at the surface and objects that are away from the surface. The input device includes a processing system and an array of sensor electrodes adapted to capacitively sense objects in a sensing region. The processing system is configured to determine first positional information for an input object in a first portion of the sensing region based on a difference between a first frame of the first plurality of frames and a filtered frame even when the input object is determined to be in the sensing region when the first plurality of frames are acquired, wherein the filtered frame is based on one or more of the first plurality of frames.

21 Claims, 5 Drawing Sheets

SENSOR DEVICE AND METHOD FOR DETECTING PROXIMITY EVENTS

FIELD OF THE INVENTION

This invention generally relates to electronic devices, and more specifically relates to sensor devices and using sensor devices for producing user interface inputs.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Presently known capacitive sensing devices are limited to accurately detecting input objects that are at or very near the surface. Specifically, most capacitive sensing devices can accurately determine location and/or motion of objects that are either right at the surface, or very near to the surface. However, when the objects are farther away from the surface, detection accuracy degrades, and most devices cannot reliably respond to such objects, and thus simply ignore such objects. This limits the flexibility and usability of the sensor device. Thus, there exists a need for capacitive sensing devices that enhance device flexibility and usability.

BRIEF SUMMARY OF THE INVENTION

The embodiments of the present invention provide a device and method that facilitates improved device usability. Specifically, the device and method provide improved user interface functionality by facilitating user input with input objects that may be either at the surface or away from the surface. The input device includes a processing system and an array of sensor electrodes adapted to capacitively sense objects in a sensing region. The sensor device is adapted to provide user interface functionality by facilitating data entry responsive to proximate objects, both at the surface and away from the surface.

One of the challenges for proximity sensing of remote gestures, such as an air swipe, is that the signals being detected are quite small compared to signals associated with traditional touch sensing. This results in a very low signal-to-noise ratio (SNR) which tends to yield an unacceptably high rate of false positive and false negative detections. The problem is exacerbated by variations in baseline capacitance used in presently known processing models.

Accordingly, embodiments of the present invention employ a processing system configured to implement a differential detection method for detecting moving objects (such as a user's hand) in a first portion of the sensing region away from the sensing surface. The processing system employs various filtering techniques in conjunction with a sliding window of object position estimates to discriminate between a valid and an invalid air swipe based on, for example, maximum and minimum anticipated swipe velocities and velocity uniformity. The present methods avoid the inaccuracies associated with using a traditional baseline capacitance as a basis for acquiring "difference" capacitance values, and instead uses a dynamic baseline value which is a function of previously measured capacitance values. The resulting positional information can then be used by the system to provide a wide range of user interface functionality.

By configuring the processing system in this way, the input device and method can reliably determine positional information for objects that are away from the surface using the same array of sensor electrodes that are used to determine positional information for objects at the surface. The positional information may include (or can be used to obtain) position estimates. The position estimates may include location information (including x, y, and z coordinates) as well as information related to one or more of pressure, force, size, shape, input object type, and the like. Thus, the sensor device provides increased user interface flexibility.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability. User interface functionality may be enhanced by facilitating user input with objects that are at the surface as well as objects that are away from the surface. Specifically, the device and method of the present invention employ a differencing scheme whereby a current profile value is differenced with a filtered version of one or more previous profile values, for example using a high pass filtering operation. The positional information is extracted from the differenced data, and subsequently processed to determine whether a valid air swipe has occurred. In this way, reliable position information may be obtained based on a dynamic baseline, as opposed to conventional static baseline differencing scheme.

Figure 1:
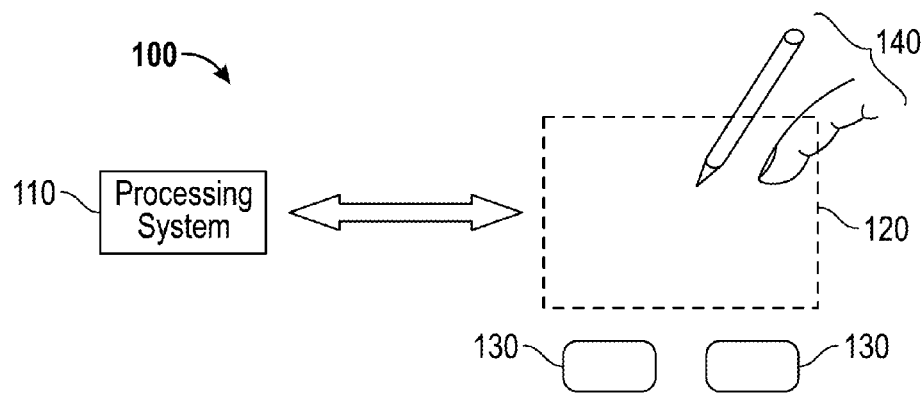
FIG. 1 is a block diagram of an exemplary system that includes an input device in accordance with an embodiment of the invention.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
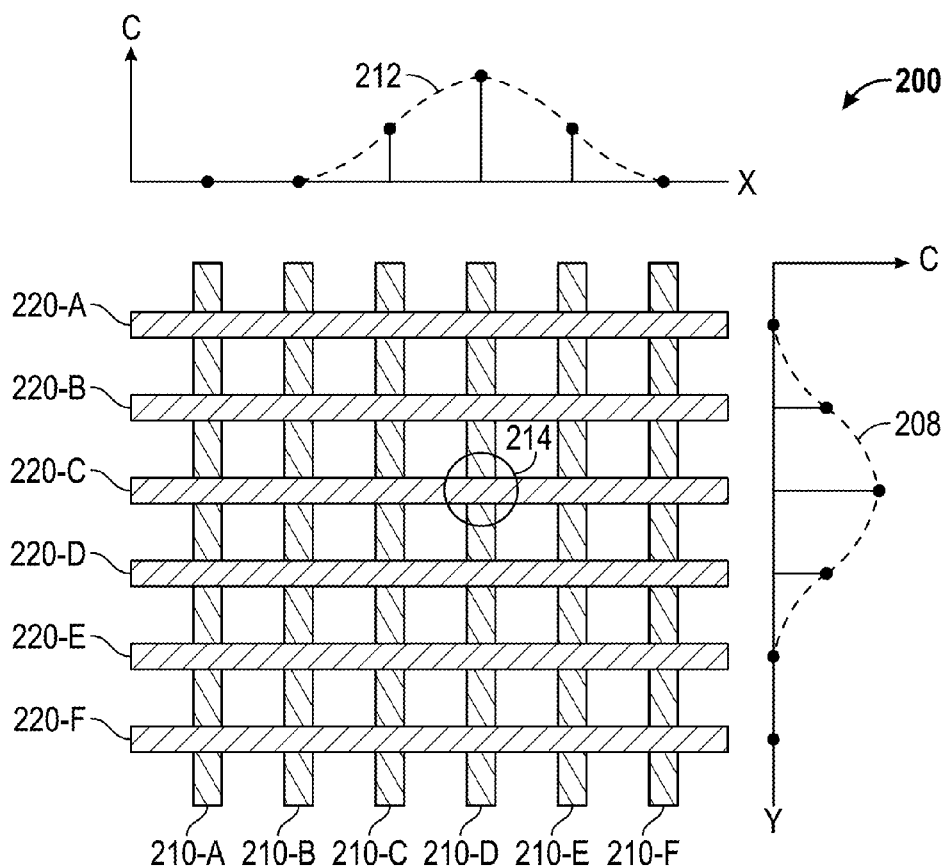
FIG. 2 is schematic view of a portion of an exemplary sensor electrode pattern and associated capacitance values for the X and Y coordinates in accordance with an embodiment of the invention.

FIG. 2 shows a portion of an example sensor electrode pattern configured to sense in a sensing region associated with the pattern, according to some embodiments. For clarity of illustration and description, FIG. 2 shows a pattern (e.g., an array) 200 of simple rectangles, and does not show various components. This sensor electrode pattern comprises a first plurality of sensor electrodes 210 (210A-210F) and a second plurality of sensor electrodes 220 (220A-220F) disposed over the first plurality of sensor electrodes 160.

Sensor electrodes 210 and sensor electrodes 220 are typically ohmically isolated from each other. That is, one or more insulators separate sensor electrodes 210 and sensor electrodes 220 and prevent them from electrically shorting to each other. In some embodiments, sensor electrodes 210 and sensor electrodes 220 are separated by insulative material disposed between them at cross-over areas; in such constructions, the sensor electrodes 210 and/or sensor electrodes 220 may be formed with jumpers connecting different portions of the same electrode. In some embodiments, sensor electrodes 210 and sensor electrodes 220 are separated by one or more layers of insulative material. In some other embodiments, sensor electrodes 210 and sensor electrodes 220 are separated by one or more substrates; for example, they may be disposed on opposite sides of the same substrate, or on different substrates that are laminated together. Moreover, one or more of the sensor electrodes can be used for both capacitive sensing and for updating the display.

With continued reference to FIG. 2, the first plurality of sensor electrodes 210 extend along the "X" direction, and the second plurality of sensor electrodes 220 extend along the "Y" direction. When an input object is placed at or near the surface of the sensing region, for example, at location 214 (corresponding to the intersection of electrodes 220C and 210D), the sensor electrodes in pattern 200 capacitively sense the presence of the input object. The measured capacitance at each node within the array may be represented by an X profile 212 and a Y profile 208. For purposes of the ensuing discussion, a frame refers to a profile of data at a particular time [i]. Thus, the term $C_X[i]$ represents the signal value of the X profile at time [i], and the term $C_Y[i]$ represents the signal value of the Y profile at time [i].

Although the sensing data is represented by X profile 212 and Y profile 208 in FIG. 2, it should be understood that various other data representations ("projections") could also be employed. In this context, the term "projection" may refer to a summation of measurements of sensor electrode values, such as the X and Y coordinate projections shown in FIG. 2; alternatively, the sensing data could be represented as an orthogonal side view or top view of sensor electrode values. That is, in various embodiments, a projection corresponds to measurements between each sensor electrode and an input object. In an exemplary embodiment, the projections are illustrated as profiles along the coordinate axes of the sensor electrode array; however, the projections may be along any direction or orientation. Further, while the profiles are shown as analog representations, discrete or other values may also be used in the context of the present invention.

Figure 3:
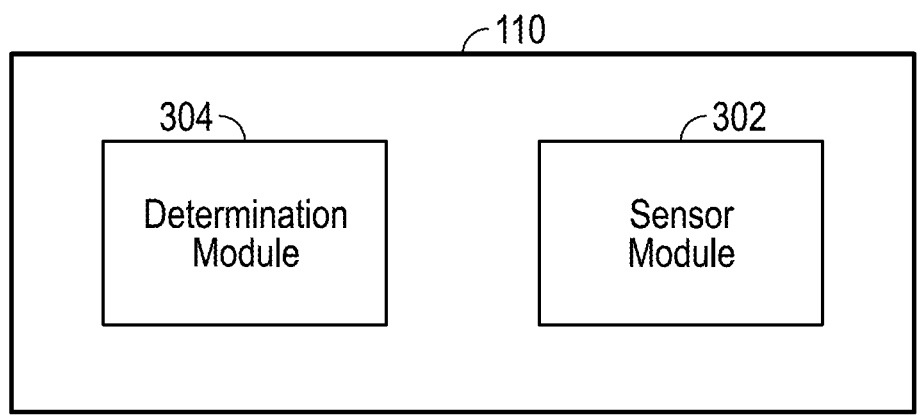
FIG. 3 is a schematic view of an exemplary processing system in accordance with an embodiment of the invention.

Referring now to FIGS. 1 and 3, the processing system 110 includes a sensor module 302 and a determination module 304. Sensor module 302 is configured to receive frames of data (referred to as resulting signals) from the sensor electrodes associated with sensing region 120. Determination module 304 is configured to process the data, and to determine first positional information for an input object in the first portion of the sensing region (away from the surface) based on a difference between a first frame of a first plurality of frames and a filtered frame, even when the input object is determined to be in the sensing region when the first plurality of frames are acquired, wherein the filtered frame is based on one or more of the first plurality of frames, and wherein the second portion of the sensing region is between the surface and the first portion.

By configuring the processing system 110 in this way, the input device 100 can reliably determine positional information for input objects that are away from the surface using the same sensor electrodes that are used to determine positional information for input objects at the surface without the need for the static baseline measurements associated with prior art schemes.

Figure 4:
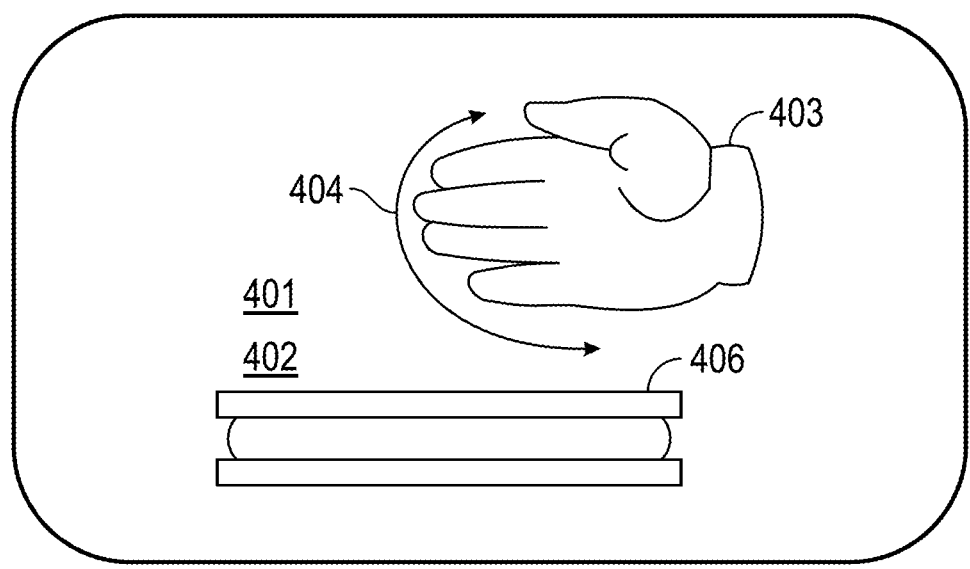
FIG. 4 is a schematic view of an exemplary object away from a sensing surface in accordance with an embodiment of the invention.

Turning now to FIG. 4, a typical example of an input object away from the sensing surface is illustrated schematically. Specifically, FIG. 4 shows an example of a user's hand 403 making a swiping motion 404 above a surface 406 of an input sensor device. In the context of this disclosure, the sensing region includes a first portion 401 away from the surface, and a second portion 402 at or near the surface; that is, the second portion 402 is located between the first portion 401 and the surface 406.

It should be noted that the location and extent of these first and second portions of the sensing region will depend on the implementation of the input device. In general, the second portion 402 is that portion in which the device can accurately determine the position of an input object to the extent needed for traditional user input with gestures, such as tap, double tap, drag, etc. In a typical input device, the second portion of the sensing region is that portion that is at or very near the surface. The precise extent of the second portion would typically depend upon the shape and arrangement of the sensor electrodes, the thickness and material composition of the various layers, and the techniques used to measure changes the capacitance.

Likewise, the first portion 401 is above second portion, such that the second portion is between the first portion and the surface. The first portion can thus be beyond the range in which the sensor can be used for traditional user input with gestures. However, it should be noted that there is no requirement for any specific or defined boundary between the first and second portions. Instead, it is sufficient that capacitive sensing be adapted to determine positional information for objects away from the surface, using the techniques described in greater detail below.

The embodiments of the invention can be used to enable a variety of different capabilities on the input device. Specifically, it can be used to enable the same input device that is used for cursor positioning, scrolling, dragging, and icon selection, and other user input at the surface, to receive input in the form of objects above the surface. As one specific example, a touch screen or other capacitive sensing device can be adapted to close windows on a desktop, put a computer into sleep mode, or perform some other type of mode switch in response to the user swiping a hand over the sensor. As will be described in greater detail, different actions can be configured to occur in response to swipes in different directions. Additionally, the input device can be configured to reject or ignore swipes that are more likely to be inadvertent motions. The input device can also be configured to detect presence, approach, and departure of input objects.

As noted above, the embodiments of the invention can be implemented with a variety of different types and arrangements of capacitive sensor electrodes. To name several examples, the input device can be implemented with electrode arrays that are formed on multiple substrate layers, typically with the electrodes for sensing in one direction (e.g., the "X" direction) formed on a first layer, while the electrodes for sensing in a second direction (e.g., the "Y" direction are formed on a second layer. In other embodiments, the sensor electrodes for both the X and Y sensing can be formed on the same layer. In yet other embodiments, the sensor electrodes can be arranged for sensing in only one direction, e.g., in either the X or the Y direction. In still another embodiment, the sensor electrodes can be arranged to provide positional information in polar coordinates, such as "r" and "0" as one example. In these embodiments the sensor electrodes themselves are commonly arranged in a circle or other looped shape to provide "0", with the shapes of individual sensor electrodes used to provide "r".

Also, a variety of different sensor electrode shapes can be used, including electrodes shaped as thin lines, rectangles, diamonds, wedge, etc. Finally, a variety of conductive materials and fabrication techniques can be used to form the sensor electrodes. As one example, the sensor electrodes are formed by the deposition and etching of conductive ink on a substrate.

Figure 5:
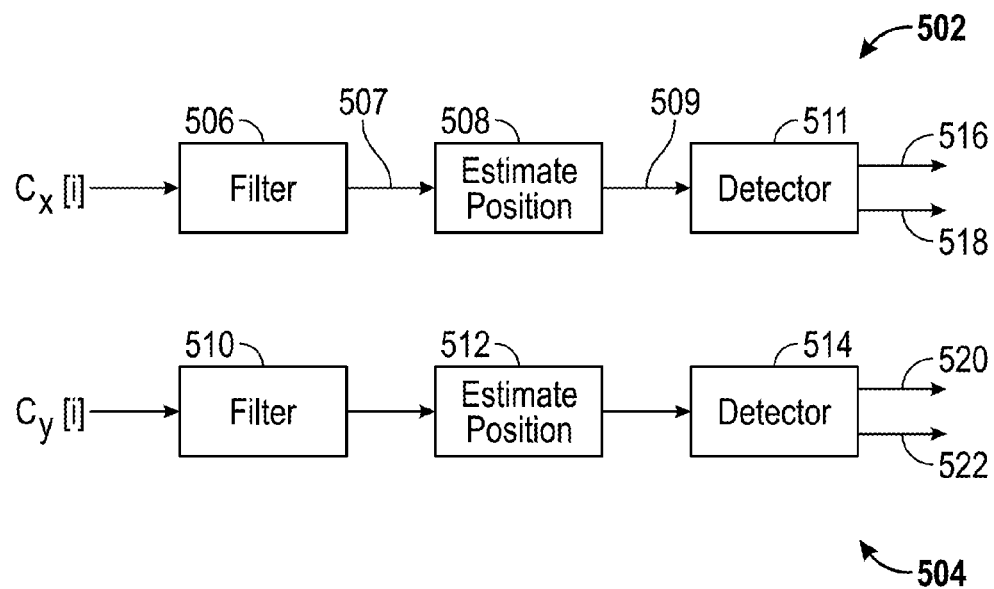
FIG. 5 is a block diagram of a processing architecture for detecting proximity events in accordance with an embodiment of the invention.

Referring now to FIG. 5, a processing architecture 502 and an analogous processing architecture 504 are illustrated for processing X and Y coordinate data, respectively. Specifically, processing system 110, and particularly determination module 304, is configured to process a plurality of temporally sequential frames for each of the X and Y coordinates to thereby determine position information and, ultimately, swipe validity and velocity information for an input object interacting with the sensing region. Processing architecture 502 includes a filter 506, a position estimator 508, and a detector 511. Processing architecture 504 includes a filter 510, a position estimator 512, and a detector 514. The operation of processing architecture 502 will now be described in detail, it being understood that architecture 504 operates in similar fashion.

Figure 6:
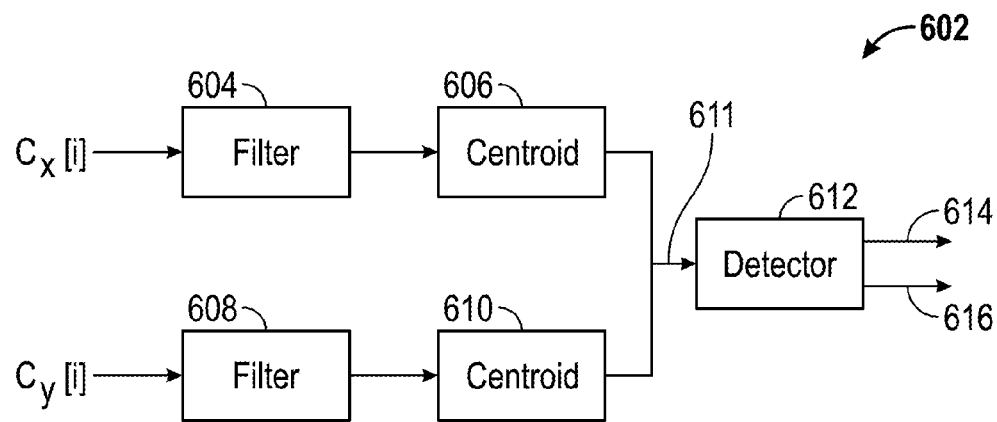
FIG. 6 is a block diagram of a processing architecture for detecting proximity events in accordance with an alternate embodiment of the invention.

With momentary reference to FIG. 6, an alternative embodiment illustrates a processing architecture 602 having an X profile filter 604, an X profile centroid estimator 606, a Y profile filter 608, a Y centroid estimator 610, and a composite detector 612. In this alternative architecture 602, the centroid positional information for the X profile data and the Y profile data are combined and a composite positional information signal 611 is applied to the detector 612. It should be noted that any or all of the features and functions described herein could be implemented in any combination of hardware, firmware, and/or software.

With continued reference to FIG. 5 and with momentary reference to FIGS. 1-4, sensor electrode array 200 measures the interaction of input object 403 with sensing region 120. A plurality of temporally adjacent frames $C_X[i]$ are sequentially applied to filter 506. Based on the plurality of frames, filter 506 determines positional information 507 and applies the positional information to position estimator 508. Position estimator 508 processes the position information 507 and outputs processed positional information 509, and applies the processed positional information 509 to the detector 511. As described in greater detail below, detector 511 compares the processed positional information to one or more threshold values, and outputs an air swipe validity signal 516 and a velocity signal 518. In a preferred embodiment, air swipe validity signal 516 is a binary value, such as a "1" indicating a valid air swipe, and a "0" indicating an invalid air swipe. Velocity signal 518 is suitably a vector indicating the X component of the air swipe speed (the Y component of the air swipe speed is given by the analogous output 522 from processing architecture 504).

Figure 7:
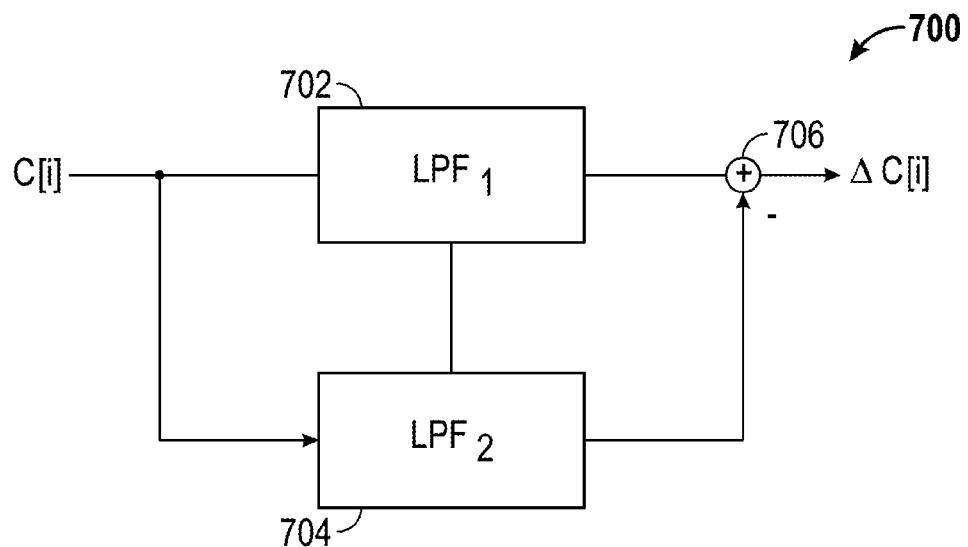
FIG. 7 is a block diagram of a bypass filter architecture in accordance with an embodiment of the invention.

The filter 506 (as well as the filter 510) may be implemented as a band pass filter 700 illustrated in FIG. 7. The band pass filter 700 includes a first low pass filter ($LPF_1$) 702 and a second low pass filter ($LPF_2$) 704. The respective outputs of the first low pass filter 702 and the second low pass filter 704 are subtracted at a summer 706, to thereby provide a difference value $\Delta C[i]$ representing the input to the band pass filter 700 with a dynamic baseline subtracted out; that is, a filtered version of one or more previous frames is subtracted from each current frame. This difference value $\Delta C[i]$ effectively represents the change in the signal since the previous measurement. In various embodiments, other filter structures may be used to implement the bandpass filter. In some embodiments, a high pass filter may be used in place of the bandpass filter.

In one embodiment, the first low pass filter 702 may be in the form of a finite impulse response (FIR) filter having unity taps, also referred to as a boxcar filter. However, in other embodiments, other types of low pass filters may be used. Functionally, the first low pass filter 702 computes an average profile value for successive frames over time, and has the effect of filtering out noise from the input signals. The first low pass filter 702 may be omitted from processing architecture 502, if desired.

The second low pass filter 704 may be implemented as a lower order infinite impulse response (IIR) filter of the form:

$$LPF_2: C[i] = \alpha C[i] + (1-\alpha)C[i-1]; \text{where } 0 < \alpha < 1.$$

Functionally, the second low pass filter 704 provides the aforementioned dynamic baseline. The maximum and minimum acceptable air swipe velocities may be determined by dynamically or statically setting the coefficient value $\alpha$. In various embodiments, $LPF_1$ may be omitted (thus creating a high-pass filter) or $LPF_1$ may be implemented as an IIR filter. Conversely, $LPF_2$ could be implemented as an FIR filter. In some embodiments, delay may be incorporated into $LPF_1$ to match the delay of $LPF_2$.

Returning now to FIG. 5, the position estimator 508 provides the processed positional information 509 to the detector 511. The detector 502 determines whether the processed positional information satisfies various compliance criteria for evaluating a valid air swipe.

Figure 8A:
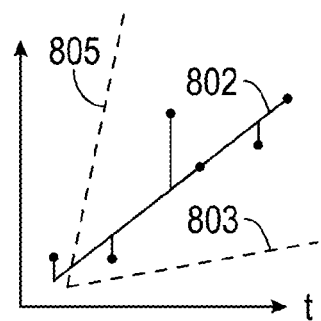
FIGS. 8A-8C are schematic plots of object position information versus time in accordance with an embodiment of the invention.
Figure 8B:
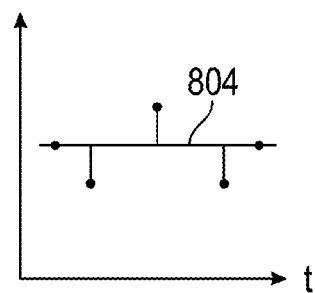
Figure 8C:
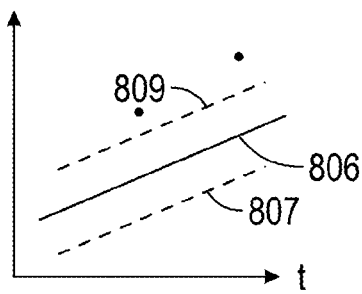

More particularly and with reference to FIGS. 8A-8C, the output 509 of the position estimator 508 essentially constitutes a sliding window of object position estimates, which may be graphically illustrated as a plot of individual position estimates versus time to facilitate the present analysis. Conceptually, any desired number of position estimates may be plotted and evaluated against at least the following two compliance criteria: i) whether the slope of the resulting "line" exceeds a first threshold; and ii) whether the sum of errors for the position estimates exceeds a second threshold value. Inasmuch as a plot of position versus time essentially correlates to air swipe velocity, the slope of the line determines whether the air swipe under inspection satisfies maximum and minimum velocity criteria; that is, the slope determines whether the air swipe is too fast or too slow and should thus be disregarded as an invalid air swipe. The sum of errors criterion essentially determines whether the air swipe corresponds to a deliberate gesture of substantially uniform speed; that is, a smooth motion will be regarded as an intentional gesture, whereas a jittery motion may be disregarded as an unintended artifact.

FIG. 8A illustrates a characteristic line 802 for various sequential position estimates. The line 802 may be calculated using any convenient method, such as a least squares approximation. FIG. 8A suggests that the line 802 satisfies the first compliance criteria relating to slope, in that the slope of the line 802 is greater than a minimum velocity threshold value represented by dashed line 803, and less than a maximum velocity threshold value represented by dashed line 805. By comparison, the characteristic line 804 (FIG. 8B) does not satisfy the velocity criteria since the slope of line 804 is less than that prescribed by dashed line 803.

With regard to the second exemplary compliance criteria, it can be seen that a characteristic line 806 illustrated in FIG. 8C exceeds the sum of errors threshold graphically represented by error boundary lines 807 and 809. By comparison, the line 802 shown in FIG. 8A satisfies the sum of errors criteria since the distance between the position values and the line 802 does not exceed the sum of errors boundary (not shown in FIG. 8A for clarity).

Figure 9:
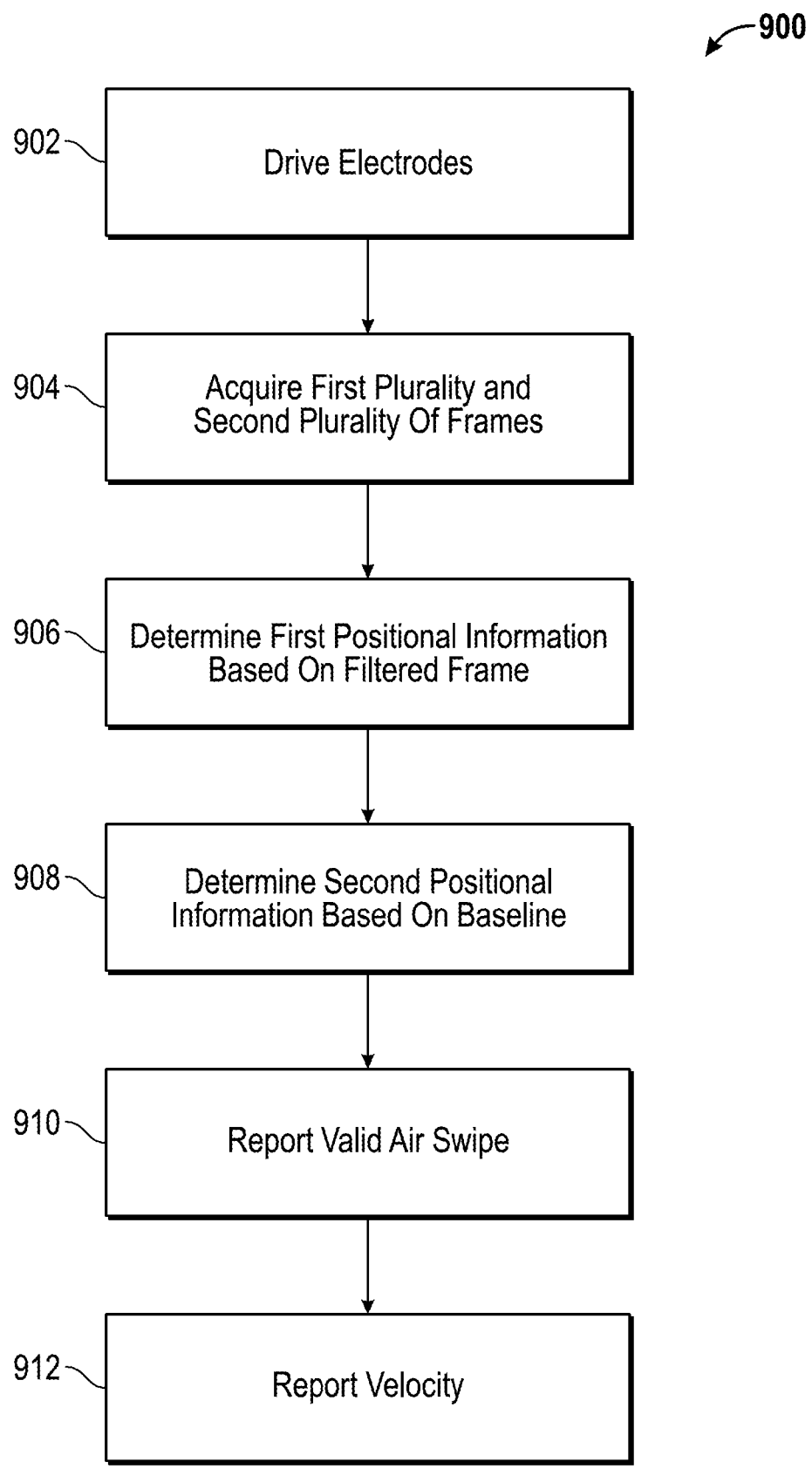
FIG. 9 is a flow diagram of an exemplary method of detecting valid air swipes in accordance with an embodiment of the invention.

Referring now to FIG. 9, a flow chart illustrates an exemplary method 900 for detecting valid air swipes in accordance with various embodiments. The method 900 includes driving (task 902) the sensor electrode array 200 (see FIG. 4) and acquiring (task 904) a first plurality of frames and a second plurality of frames. The method 900 determines (task 906) first positional information for the first plurality of frames based on a filtered frame (i.e., a dynamic baseline). The method 900 also determines (task 908) second positional information for the second plurality of frames based on a static baseline. The method 900 reports (task 910) a valid air swipe if the first positional information satisfies predetermined compliance criteria as discussed, for example, in connection with FIG. 8. The method 900 may also report (task 912) velocity information for the air swipe.

The ability to reject invalid air swipes can be useful in avoiding inadvertent activation of those actions that could otherwise occur. It should be noted, however, that there are trade-offs in establishing when detected motion should be rejected. If the criteria are too strict then some intended motions may not always be recognized (false negatives). If the criteria are too relaxed then unintended motions may be recognized (false positives). In some applications it may be desirable to provide different levels of criteria that may be selectable by the user or adapted by the electronic system.

A processing system is thus provided for a capacitive sensing device of the type including a sensing region. The processing system includes a sensor module having sensing circuitry coupled to a plurality of sensor electrodes under a surface, wherein the sensor module is configured to acquire a first plurality of frames by driving the sensor electrodes for capacitive sensing. The processing system also includes a determination module configured to determine first positional information for an input object in a first portion of the sensing region based on a difference between a first frame of the first plurality of frames and a filtered frame even when the input object is determined to be in the sensing region when the first plurality of frames are acquired, wherein the filtered frame is based on one or more of the first plurality of frames; and wherein a second portion of the sensing region is between the surface and the first portion of the sensing region.

In an embodiment, the sensor module is configured to acquire a second plurality of frames, and the determination module is configured to determine second positional information for the input object in the second portion of the sensing region based on a difference between a baseline frame and a first frame of the second plurality of frames; wherein the baseline frame is based on a second frame in the second plurality of frames, and wherein during acquisition of the second frame of the second plurality of frames no input object is determined to be in the second portion of the sensing region. The filtered frame may be a combination of one or more of the first plurality of frames.

The determination module may be configured to process the first positional information, and to report the presence of the input object within the first portion of the sensing region based on a comparison of the processed first positional information with a threshold value.

In a further embodiment, the determination module is configured to process the first positional information, and to report one of an arrival and a removal of the input object from the first portion of the sensing region based on a comparison of the processed first positional information with the threshold value. The determination module may also be configured to determine the first positional information for the input object in the first portion of the sensing region further based on a difference between a second frame of the first plurality of frames and a second filtered frame, and to process the first positional information according to predetermined compliance criteria. The predetermined compliance criteria can include at least one of velocity and velocity uniformity. Another criterion for compliance could relate to the total distance the input object has traveled. For example, if the input object travels less than half the length of the sensing device, any gesture related to the input object may be rejected. In other embodiments, the criterion may be greater or less than half the length of the sensing device.

In another embodiment the determination module is further configured to report a valid gesture if the processed first positional information satisfies the compliance criteria, and to report an invalid gesture if the processed first positional information does not satisfy the compliance criteria. The determination module may be configured to effect a predetermined action if the processed first positional information satisfies the predetermined compliance criteria.

In another embodiment the processing system is configured to cooperate with an electronic system, such that the predetermined action comprises controlling at least one of the following parameters of the electronic system: the on/off state; the sleep state; doze state; a gaming parameter; a joy stick; a page turn; a screen transition; actuating a light; actuating a sound; implementing a security feature; initiating an application; and terminating an application.

In a further embodiment the plurality of sensor electrodes comprises a first set of sensor electrodes defining a first direction and a second set of sensor electrodes defining a second direction, and the input object corresponds to a hand motion of substantially uniform velocity.

A sensor device having a sensing region is also provided, the sensor device including a plurality of sensor electrodes under a surface and a processing system coupled to the electrodes and configured to: acquire a first plurality of frames and a second plurality of frames by driving the sensor electrodes for capacitive sensing; determine second positional information for an input object in a second portion of the sensing region based on a difference between a baseline frame and a first frame of the second plurality of frames, wherein the baseline frame is based on a second frame in the second plurality of frames, and wherein during acquisition of the second frame of the first plurality of frames no input object is determined to be in the second portion of the sensing region; and determine first positional information for the input object in a first portion of the sensing region based on a difference between a first frame and a second frame of the first plurality of frames, wherein the input object is determined to be in the first portion of the sensing region during acquisition of the first and second frames of the first plurality of frames and wherein the second portion sensing region is between the first portion of the sensing region and the surface.

The processing system may be configured to process the first positional information, and to report one of the presence of the input object within, and the removal of the input object from, the first portion of the sensing region based on a comparison of the processed first positional information with a threshold value.

In another embodiment the processing system is configured to determine the first positional information for the input object in the first portion of the sensing region based on a difference between a third frame and the second frame of the first plurality of frames, and to process the first positional information according to predetermined compliance criteria, wherein the predetermined compliance criteria includes at least one of velocity and velocity uniformity. The determination module may be configured to report a valid gesture if the processed first positional information satisfies the compliance criteria, and to report and invalid gesture if the processed first positional information does not satisfy the compliance criteria.

In an embodiment, the processing system is configured to cooperate with an electronic system and to effect a predetermined action if the processed first positional information satisfies the predetermined compliance criteria, wherein the predetermined action comprises controlling at least one of the following parameters of the electronic system: the on/off state; the sleep state; doze state; a gaming parameter; a joy stick; a page turn; a screen transition; actuating a light; actuating a sound; implementing a security feature; initiating an application; and terminating an application. The predetermined compliance criteria may comprise a range of slope values corresponding to a plot of at least the processed first positional information versus time, and a maximum threshold value corresponding to a summation of error values for at least the processed first positional information.

A method is provided for detecting proximity events using a capacitive sensing device of the type including a plurality of sensor electrodes under a surface, wherein the capacitive sensing device comprises a sensing region above the surface, the sensing region having a second portion located between the surface and a first portion of the sensing region. The method includes driving the electrodes for capacitive sensing of an input object; acquiring a first plurality of frames and a second plurality of frames; determining first positional information for an input object in the first portion of the sensing region away from the surface using a first process which does not use a baseline value, wherein the first process involves a difference between a first frame and a second frame of the first plurality of frames, wherein the input object is determined to be in the first portion of the sensing region during acquisition of the first and second frames of the first plurality of frames; and determining second positional information for an input object in the second portion of the sensing region using a second process involving a difference between a first frame and a second frame of the second plurality of frames, wherein the second frame is a baseline frame and wherein during acquisition of the baseline frame no input object is determined to be in the second portion of the sensing region.

The method may also include determining whether the first positional information corresponds to the input object entering, leaving, or remaining within the first portion of the sensing region. In another embodiment the method also involves determining whether the first positional information corresponds to a hand motion of substantially uniform velocity substantially parallel to and spaced apart from the surface.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for a capacitive sensing device comprising a sensing region, the processing system comprising:
a sensor module comprising sensing circuitry coupled to a plurality of sensor electrodes under a surface, wherein the sensor module is configured to acquire a first plurality of frames by driving the sensor electrodes for capacitive sensing; and
a determination module configured to determine first positional information for an input object in a first portion of the sensing region based on a difference between a first frame of the first plurality of frames and a filtered frame even when the input object is determined to be in the sensing region when the first plurality of frames are acquired, wherein the filtered frame is based on one or more of the first plurality of frames; and
wherein a second portion of the sensing region is between the surface and the first portion of the sensing region.

2. The processing system of claim 1, wherein:
the sensor module is configured to acquire a second plurality of frames; and
the determination module is configured to determine second positional information for the input object in the second portion of the sensing region based on a difference between a baseline frame and a first frame of the second plurality of frames;
wherein the baseline frame is based on a second frame in the second plurality of frames, and wherein during acquisition of the second frame of the second plurality of frames no input object is determined to be in the second portion of the sensing region.

3. The processing system of claim 1, wherein the filtered frame is a combination of one or more of the first plurality of frames.

4. The processing system of claim 1, wherein the determination module is configured to process the first positional information, and to report the presence of the input object within the first portion of the sensing region based on a comparison of the processed first positional information with a threshold value.

5. The processing system of claim 1, wherein the determination module is configured to process the first positional information, and to report one of an arrival and a removal of the input object from the first portion of the sensing region based on a comparison of the processed first positional information with the threshold value.

6. The processing system of claim 1, wherein the determination module is further configured to determine the first positional information for the input object in the first portion of the sensing region further based on a difference between a second frame of the first plurality of frames and a second filtered frame, and to process the first positional information according to predetermined compliance criteria.

7. The processing system of claim 6, wherein the predetermined compliance criteria includes at least one of velocity, velocity uniformity, and distance traveled by the input object.

8. The processing system of claim 6, wherein the determination module is further configured to report a valid gesture if the processed first positional information satisfies the compliance criteria, and to report an invalid gesture if the processed first positional information does not satisfy the compliance criteria.

9. The processing system of claim 5, wherein the determination module is further configured to effect a predetermined action if the processed first positional information satisfies the predetermined compliance criteria.

10. The processing system of claim 9, wherein:
The processing system is configured to cooperate with an electronic system; and
the predetermined action comprises controlling at least one of the following parameters of the electronic system: the on/off state; the sleep state; doze state; a gaming parameter; a joy stick; a page turn; a screen transition; actuating a light; actuating a sound; implementing a security feature; initiating an application; and terminating an application.

11. The processing system of claim 1, wherein the plurality of sensor electrodes comprises a first set of sensor electrodes defining a first direction and a second set of sensor electrodes defining a second direction.

12. The processing system of claim 1 wherein the input object corresponds to a hand motion of substantially uniform velocity.

13. A sensor device comprising a sensing region, the sensor device further comprising:
plurality of sensor electrodes under a surface; and
a processing system coupled to the electrodes and configured to:
acquire a first plurality of frames and a second plurality of frames by driving the electrodes for capacitive sensing;
determine second positional information for an input object in a second portion of the sensing region based on a difference between a baseline frame and a first frame of the second plurality of frames, wherein the baseline frame is based on a second frame in the second plurality of frames, and wherein during acquisition of the second frame of the first plurality of frames no input object is determined to be in the second portion of the sensing region; and
determine first positional information for the input object in a first portion of the sensing region based on a difference between a first frame and a second frame of the first plurality of frames, wherein the input object is determined to be in the first portion of the sensing region during acquisition of the first and second frames of the first plurality of frames and wherein the second portion sensing region is between the first portion of the sensing region and the surface.

14. The sensor device of claim 13, wherein the processing system is configured to process the first positional information, and to report one of the presence of the input object within, and the removal of the input object from, the first portion of the sensing region based on a comparison of the processed first positional information with a threshold value.

15. The sensor device of claim 13, wherein the processing system is configured to determine the first positional information for the input object in the first portion of the sensing region based on a difference between a third frame and the second frame of the first plurality of frames, and to process the first positional information according to predetermined compliance criteria, wherein the predetermined compliance criteria includes at least one of velocity and velocity uniformity.

16. The sensor device of claim 14, wherein the determination module is further configured to report a valid gesture if the processed first positional information satisfies the compliance criteria, and to report and invalid gesture if the processed first positional information does not satisfy the compliance criteria.

17. The sensor device of claim 15, wherein the processing system is configured to cooperate with an electronic system and to effect a predetermined action if the processed first positional information satisfies the predetermined compliance criteria, wherein the predetermined action comprises controlling at least one of the following parameters of the electronic system: the on/off state; the sleep state; doze state; a gaming parameter; a joy stick; a page turn; a screen transition; actuating a light; actuating a sound; implementing a security feature; initiating an application; and terminating an application.

18. The sensor device of claim 15, wherein the predetermined compliance criteria comprise a range of slope values corresponding to a plot of at least the processed first positional information versus time, and a maximum threshold value corresponding to a summation of error values for at least the processed first positional information.

19. A method of detecting proximity events using a capacitive sensing device comprising a plurality of sensor electrodes under a surface, wherein the capacitive sensing device comprises a sensing region above the surface, the sensing region having a second portion located between the surface and a first portion of the sensing region, the method comprising:
driving the electrodes for capacitive sensing of an input object;
acquiring a first plurality of frames and a second plurality of frames;
determining first positional information for an input object in the first portion of the sensing region away from the surface using a first process which does not use a baseline value, wherein the first process involves a difference between a first frame and a second frame of the first plurality of frames, wherein the input object is determined to be in the first portion of the sensing region during acquisition of the first and second frames of the first plurality of frames; and
determining second positional information for an input object in the second portion of the sensing region using a second process involving a difference between a first frame and a second frame of the second plurality of frames, wherein the second frame is a baseline frame and wherein during acquisition of the baseline frame no input object is determined to be in the first second portion of the sensing region.

20. The method of claim 19, further comprising determining whether the first positional information corresponds to the input object entering, leaving, or remaining within the first portion of the sensing region.

21. The method of claim 19, further comprising determining whether the first positional information corresponds to a hand motion of substantially uniform velocity substantially parallel to and spaced apart from the surface.

* * * * *